US Patent Number: 4,954,919
Date of Patent: Sep. 4, 1990
Inventor: Tadaharu Yamada, Tokyo, Japan
Assignee: NEC Corporation, Tokyo, Japan
Appl. No.: 382,882
Filed: Jul. 21, 1989

[54] ROTARY SEEK MAGNETIC HEAD ASSEMBLY HAVING A LOOPED LOAD BEAM END TO ACHIEVE HIGH SPEED ACCESS

Foreign Application Priority Data
Jul. 25, 1988 [JP] Japan .................. 63-186231
Jul. 26, 1988 [JP] Japan .................. 63-187109

[51] Int. Cl.⁵ ............................... G11B 5/48
[52] U.S. Cl. .................................. 360/104
[58] Field of Search ................. 360/103–104

[56] References Cited
U.S. PATENT DOCUMENTS
4,797,763  1/1989  Levy .......................... 360/104

Primary Examiner—A. J. Heinz
Attorney, Agent, or Firm—Sughrue, Mion, Zinn, Macpeak & Seas

[57] ABSTRACT

A rotary seek magnetic head assembly includes a rigid arm section mounted at one end on a rotary shaft. A load beam element is joined to the other end of the rigid arm section, the element having a portion substantially resilient adjacent to the rigid arm section. The load beam element is rigid over its length from the resilient portion to a point where a looped load bearing section is joined to present a loading force thereon. The looped load bearing section is formed with two arms extending from the load beam element to a cross leg which runs substantially parallel to the direction of rotary seek and is formed with a protuberance. A gimbal spring has a pair of outer flexible fingers which are joined at their first ends to the looped load bearing section and joined at their second ends by a cross leg from which a central finger extends. All the fingers of the gimbal spring runs parallel to the direction of rotary shaft to minimize bending forces which might occur during high speed accessing movements. The central finger is in contact with the protuberance and supports an air bearing slider of U-shaped cross section.

6 Claims, 3 Drawing Sheets

ROTARY SEEK MAGNETIC HEAD ASSEMBLY HAVING A LOOPED LOAD BEAM END TO ACHIEVE HIGH SPEED ACCESS

BACKGROUND OF THE INVENTION

The present invention relates generally to flexible suspension systems for an air bearing head/arm assembly for magnetic storage devices.

Current magnetic head slider assemblies for hard disk drives are of two types. One is a linear seek type in which the head slider assembly is mounted on a linear drive mechanism that moves the assembly linearly in a radial direction of the disk. The other is a rotary seek type in which the head slider assembly is mounted on a rotary drive mechanism that drives it along an accurate path to a desired track. Since the rotary seek type requires less space than the linear seek type does and it can be made lightweight, the rotary seek type has been used extensively for small disk applications.

U.S. Pat. No. 4,167,765 discloses a transducer suspension system which includes a rectangular flexure having two narrow flexible fingers that are disposed parallel to a longitudinal axis of a load beam. The flexure includes a relatively stiff cross leg that joins the two flexible fingers at the free end. The cross leg is offset toward the magnetic media and leads to a central narrow finger to which the air bearing slider is attached. The load beam is fastened to the flexure and engages a protuberance disposed on the central finger to hold the flexure in operating position. The load beam includes a resilient section for flexibly mounting the transducer suspension mount apparatus and a rigid flanged channel section for engagement to the flexure.

If the prior art suspension system is employed in a rotary seek mode, it lacks sufficient stiffness in a direction transverse to the length of the system to withstand bending forces that might occur as a result of the high speed rotary seek movement of the assembly. Another disadvantage is that since the center of gravity of the head slider assembly is lower than the load beam, high speed movements of the assembly cause it to produce a violent rolling action which might produce damages to a disk. Therefore, the prior art head/arm suspension system is not suitable for rotary seek applications to take full advantage of the high speed capability of rotary seek motion.

SUMMARY OF THE INVENTION

It is therefore an object of the present invention to provide a magnetic head assembly of a rotary seek type which does not experience bending forces from the high-speed accessing movement of the head assembly.

Another object of the present invention is to provide a magnetic head assembly having a low profile, air bearing slider to achieve low profile disk storage configuration.

According to the present invention, the magnetic head assembly comprises a rigid arm section mounted at one end on a rotary shaft. A load beam element is joined to the other end of the rigid arm section, the element having a portion substantially resilient adjacent to the rigid arm section. The load beam element has a looped load bearing section and is substantially rigid over its length between the resilient portion and the looped load bearing section to present a loading force on the looped load bearing section. The looped load bearing section is formed with two arms extending from the load beam element to a cross leg which runs substantially parallel to the direction of rotation of the rotary shaft, i.e. the direction of rotary seek. A gimbal spring of rectangular configuration has a pair of outer flexible fingers joined at their first ends to one of the arms of the looped load bearing section and joined at their second ends by a cross leg. A central finger extends from the cross leg, all the fingers of the gimbal spring running substantially parallel to the direction of rotary seek. The central finger is in pressure point contact with the cross leg of the looped load bearing section. An air bearing slider is attached to the central finger of the gimbal spring. With the parallel configuration of the gimbal spring fingers to the direction of rotary seek, the bending forces that might arises during high speed accessing movements are minimized.

In a preferred embodiment, the air bearing slider comprises a pair of side elements which run substantially parallel to the direction of rotary seek and joined at their lower ends by a base element to form a U-shaped cross-section. One of the side elements extends through an opening of the looped load bearing section to allow proper pitching and rolling actions of the slider. The base element is fastened to the central finger of the gimbal spring to accommodate the gimbal spring in a groove formed by the U-shaped cross section, whereby pitching and rolling moment produced as a result of accessing movement of the head assembly is concentrated in a point adjacent the center of gravity of the air bearing slider.

BRIEF DESCRIPTION OF THE DRAWINGS

The present invention will be described in further detail with reference to the accompanying drawings, in which.

DETAILED DESCRIPTION

Figure 1:
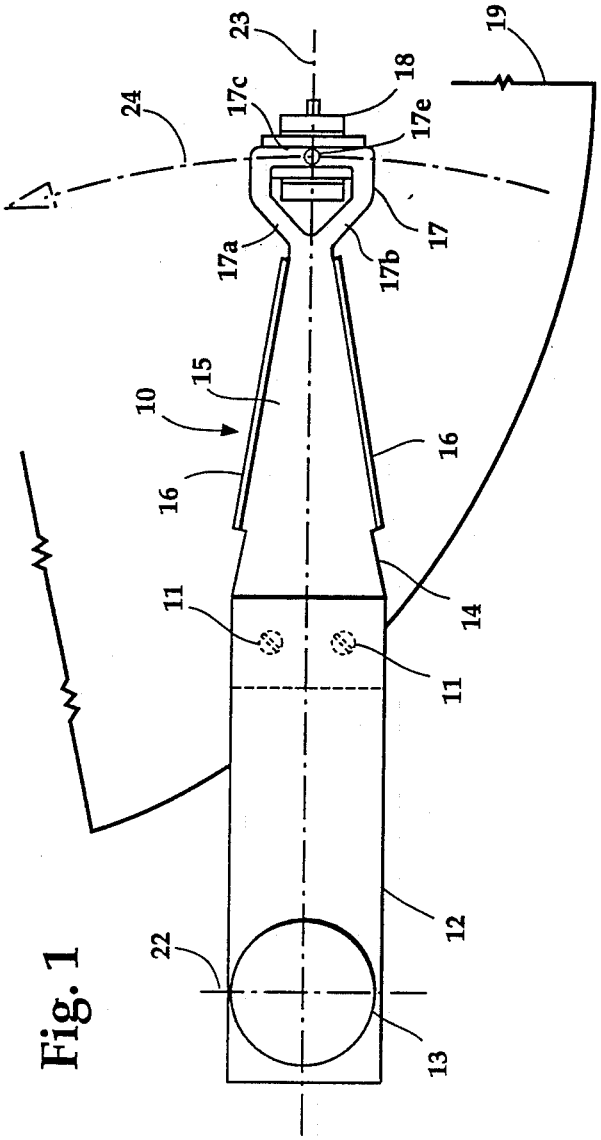
FIG. 1 is a top plan view of a magnetic head/arm assembly of a rotary seek type made in accordance with an embodiment of the present invention.
Figure 2:
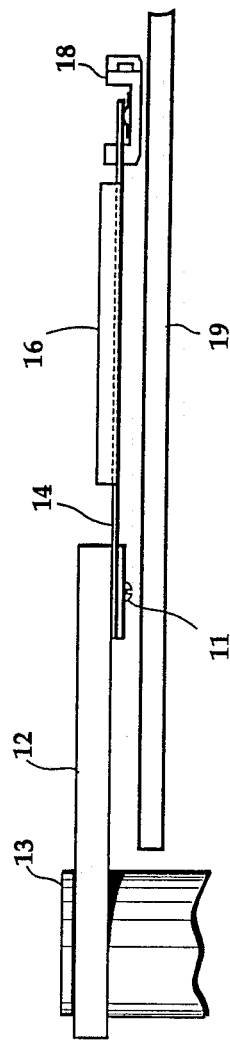
FIG. 2 is a side view of the assembly of FIG. 1.

Referring now to FIGS. 1 to 5, a magnetic head/arm assembly of a rotary seek type according to the present invention includes an air bearing suspension arm section 10 formed of stainless steel, for example, attached by welds or screws 11 to a rigid arm section 12, which is mounted on a rotary drive shaft 13. Suspension arm section 10 has a resilient spring section 14 and a load beam section 15 which is formed with a pair of turned-up side flanges 16 and leads to a looped load bearing section 17 to apply the load beam force for loading an air bearing magnetic head slider assembly 18 to a rotating magnetic disk 19. The resilient spring section 14 serves as a flexible support for the head slider assembly 18 while the load beam section 10 provides a rigid section as a load beam. The looped load bearing section 17 has a pair of side arms 17a and 17b which are joined at their ends to a cross leg 17c to form an opening 17d. Cross leg 17c is formed with a protuberance 17e.

Figure 3:
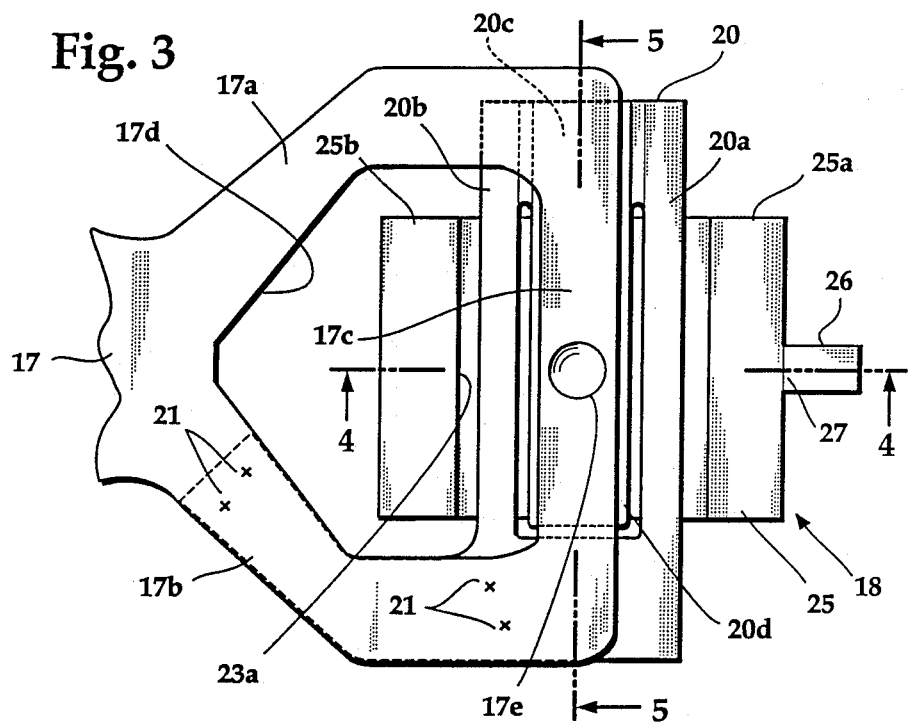
FIG. 3 is an expanded view of the looped load bearing section of FIG. 1.

A gimbal spring 20 of generally J-shaped configuration with uniform thickness is fastened to the side arm 17b of the looped load bearing section 17 by welds 21 as shown in FIG. 3. The gimbal spring 20 is formed with two narrow flexible outer fingers 20a and 20b which run parallel to an axis 22 orthogonal to a longitudinal axis 23 of the head/arm assembly, so that they run substantially parallel to the direction of seek of the head slider assembly 18 when it accesses a file of the disk 19. The flexible outer fingers 20a and 20b are connected to a crimped cross leg 20c which leads to a central finger 20d. The parallel arrangement of the fingers 20a, 20b, 20d to the direction of rotary seek increases their stiffness to withstand the encountering bending forces and hence it increases the capability of the suspension system to operate at higher accessing speeds in comparison with the prior art system in which the fingers run normal to the direction of seek.

Head slider assembly 18 has an air bearing head-carrying slider 25 having orthogonal axes passing through the center of protuberance 17e to provide symmetric configuration along the orthogonal axes for proper pitching and rolling actions. With this configuration, the longitudinal axis 23 of the assembly also passes through the center of protuberance 17e.

Figure 4:
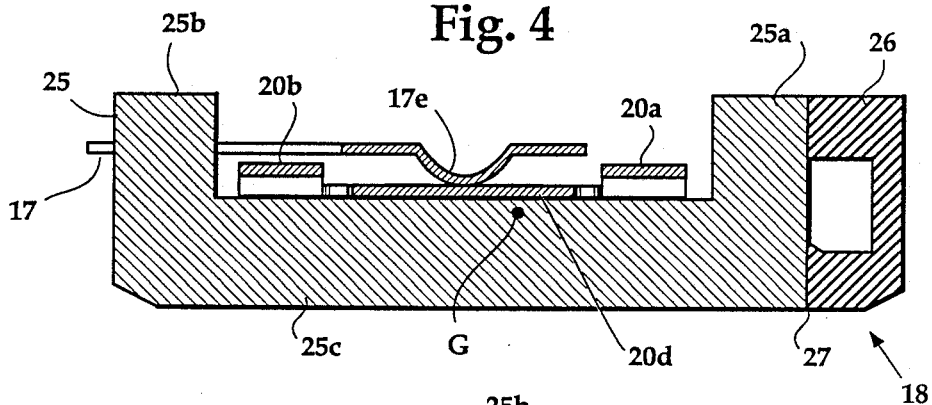
FIG. 4 is a sectional view taken along lines 4—4 of FIG. 3.
Figure 5:
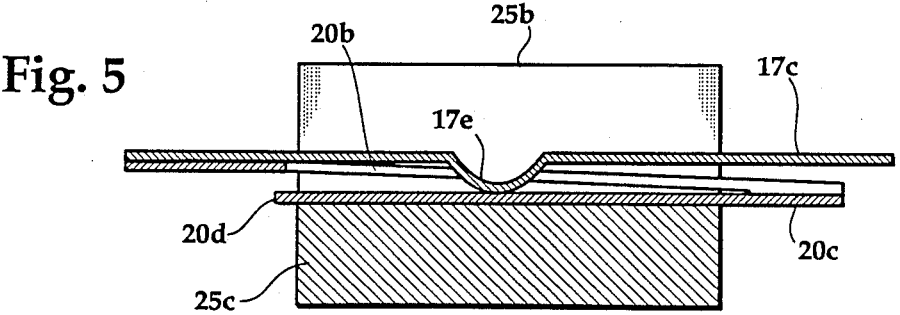
FIG. 5 is a sectional view taken along lines 5—5 of FIG. 3.

Slider 25 comprises a pair of parallel side elements 25b and 25b which run substantially parallel to the direction of rotation of the rotary shaft 13, i.e., the direction of rotary seek, and are joined at their lower ends to a base element 25c to form a generally U-shaped cross-section as viewed in the direction of rotary seek (FIG. 4). A magnetic transducer head 26, which is formed by a generally C-shaped core and a portion of slider 25, is attached to the side element 25a of the slider 25 so that a magnetic transducer gap 27 runs substantially parallel to the direction of rotary seek.

The lower surface of the center finger 20d is secured to the upper surface of the base element 25c of slider 25 by suitable adhesive and the upper surface of central finger 20d is in contact with the protuberance 17e to place the head slider assembly 18 into an air bearing position relative to the surface of the disk 19. The head slider assembly 18 is thus pivotable about the two axes which intersect the protuberance 17e. The cross leg 20c is offset from the plane of the flexible outer fingers 20a and 20b to bring the plane of the center finger 20d in a position closer to the surface of the disk 19.

The U-shaped cross-section of the head slider assembly 18 allows a low profile design by accommodating the gimbal spring 20 and the cross leg 17c of the looped load bearing section 17 in the groove defined by the inner walls of side elements 25a, 25b and base element 25c.

Protuberance 17e provides pressure point contact with the central finger 20d of gimbal spring 20 to permit the slider 25 to provide proper pitching and rolling actions relative to the plane of the load bearing section 17. The opening 17d of the load bearing section 17 serves to reduce its mass and allows the side element 25b of the slider 25 to extend through it.

With the configuration just described, the outer flexible fingers 20a, 20b, and the centrally located flexible finger 20d, which substantially run parallel to the direction of seek, ensure that the assembly responds accurately and quickly to variations in air bearing which may be encountered when the assembly is moved at high accessing speed so that the transducer gap 27 constantly maintains a fixed spacing and orientation relative to the surface of the disk 19. The U-shaped cross-section of head slider assembly 18 allows external forces acting thereon during high speed seek to be concentrated in a point close to its center of gravity which is designated G (see FIG. 4). As a result, the undesired pitch and roll moment which can occur as a result of high speed accessing movement of the head assembly can be minimized, reducing the risk of head crash on the disk surface.

The cross leg 17c of the loop 17, which run parallel to the direction of seek, serve to limit the pitching action of the head slider assembly 18. This is an additional factor that contributes to the improvement of the stiffness of the whole suspension mechanism of the present invention. In addition, the U-shaped cross-section of slider 25 allows a low-profile design of a disk drive.

Figure 6:
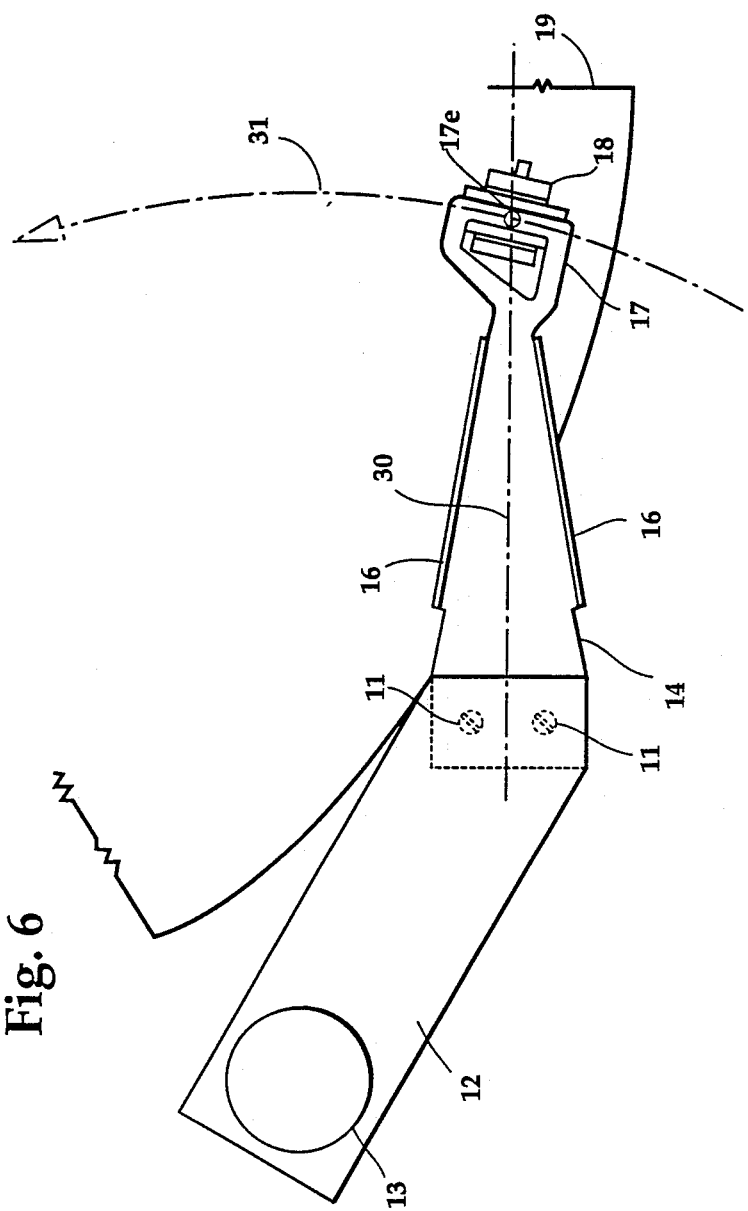
FIG. 6 is a top plan view of a modified head/arm assembly of the invention.

The present invention can be modified as shown in FIG. 6 in which the fingers 20a, 20b, 20d of gimbal spring 20 run in a direction skewed relative to a longitudinal axis 30 of the load beam section 10 which is fastened to the rigid arm section 12 at an angle thereto, with the longitudinal axis 30 passing through the center of protuberance 17e. It is evident that the fingers 20a, 20b, 20d of gimbal spring 20 are arranged so that they run substantially parallel to the direction of seek indicated by arrow 31 regardless of the angle they make relative to the longitudinal axis 30.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A magnetic head assembly comprising:
   a rigid arm section mounted at one end thereof on a rotary shaft;
   a load beam element joined to the other end of said rigid arm section, said element having a portion substantially resilient adjacent to said rigid arm section and a looped load bearing section, said element being substantially rigid between said resilient portion and said looped load bearing section to present a loading force on said looped load bearing section, said looped load bearing section having arms extending from said element to a cross leg which runs substantially parallel to the direction of rotation of said rotary shaft;
   a gimbal spring of rectangular configuration, said gimbal spring having a pair of outer flexible fingers joined at their first ends to one of said arms of said looped load bearing section and joined at their second ends by a cross leg, and a central finger extending from the last-mentioned cross leg, said outer fingers and said central finger running substantially parallel to the direction of rotation of said rotary shaft;
   means for providing a point contact between said central finger and the cross leg of said looped load bearing section; and
   an air bearing slider fastened to said central finger of said gimbal spring.

2. A magnetic head assembly as claimed in claim 1, wherein said air bearing slider comprises a pair of side elements which run substantially parallel to the direction of rotation of said rotary shaft and joined at their lower ends by a base element to form a U-shaped cross-section, one of said side elements extending through an opening of said looped load bearing section, said base element being fastened to said central finger of said gimbal spring to accommodate said gimbal spring in a groove formed by said U-shaped cross section, whereby pitching and rolling moment produced as a result of accessing movement of the head assembly is concentrated in a point adjacent the center of gravity of said air bearing slider.

3. A magnetic head assembly as claimed in claim 1, wherein the cross leg of said looped load bearing section has a protuberance which contacts with said central finger.

4. A magnetic head assembly as claimed in claim 1, wherein said air bearing slider has orthogonal axes which intersect said point contact.

5. A magnetic head assembly as claimed in claim 1, wherein said load beam element is substantially triangular having a longitudinal axis passing through said point contact.

6. A magnetic head assembly as claimed in claim 5, wherein said looped load bearing section is substantially triangular, the cross leg of said looped load bearing section running substantially perpendicular to said longitudinal axis of said load beam element.

* * * * *